United States Patent
Kiyomura

(10) Patent No.: US 10,712,173 B2
(45) Date of Patent: Jul. 14, 2020

(54) DIAGNOSTIC APPARATUS AND DIAGNOSTIC METHOD FOR ROTATIONAL ANGLE SENSOR, AND CONTROL APPARATUS FOR ACTUATOR

(71) Applicant: Hitachi Automotive Systems, Ltd., Hitachinaka-shi, Ibaraki (JP)

(72) Inventor: Akira Kiyomura, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/758,896

(22) PCT Filed: Jun. 9, 2017

(86) PCT No.: PCT/JP2017/021505
§ 371 (c)(1),
(2) Date: Mar. 9, 2018

(87) PCT Pub. No.: WO2017/213259
PCT Pub. Date: Dec. 14, 2017

(65) Prior Publication Data
US 2018/0231392 A1  Aug. 16, 2018

(30) Foreign Application Priority Data
Jun. 9, 2016 (JP) .................................. 2016-115331

(51) Int. Cl.
*G01C 25/00* (2006.01)
*G06F 11/30* (2006.01)
(Continued)

(52) U.S. Cl.
CPC ............... *G01C 25/00* (2013.01); *G01D 3/08* (2013.01); *G01D 5/204* (2013.01); *G01M 15/042* (2013.01); *G01P 21/02* (2013.01)

(58) Field of Classification Search
CPC .................................. G01C 25/00; G01D 3/08
(Continued)

(56) References Cited

U.S. PATENT DOCUMENTS

2007/0251332 A1* 11/2007 Noritou ................ G01D 5/2073
73/862.326
2012/0185213 A1* 7/2012 Wada ...................... G01D 3/08
702/183
(Continued)

FOREIGN PATENT DOCUMENTS

EP           1 850 137 A2   10/2007
JP        2002-276446 A     9/2002
(Continued)

OTHER PUBLICATIONS

English translation of JP 2012-145488, Aug. 2, 2012.*
(Continued)

*Primary Examiner* — Michael P Nghiem
(74) *Attorney, Agent, or Firm* — Crowell & Moring LLP

(57) ABSTRACT

A diagnostic apparatus for a rotational angle sensor that outputs two correlated signals, corresponding to a rotational angle, determines whether or not a failure has occurred in the rotational angle sensor based on whether or not a numerical value obtained from the two correlated signals is within a predetermined range. Then, in a case in which the diagnostic apparatus for the rotational angle sensor determines that the failure has occurred in the rotational angle sensor, the diagnostic apparatus cancels the determination that the failure has occurred in the rotational angle sensor, when the numerical value is within the predetermined range and the rotational angle obtained from the two correlated signals is an angle that cannot be recognized to be 0°, 90°, 180°, or 270°.

9 Claims, 12 Drawing Sheets

(51) Int. Cl.
*G21C 17/00* (2006.01)
*G01D 3/08* (2006.01)
*G01D 5/20* (2006.01)
*G01P 21/02* (2006.01)
*G01M 15/04* (2006.01)

(58) Field of Classification Search
USPC .................................................. 702/116, 185
See application file for complete search history.

(56) References Cited

U.S. PATENT DOCUMENTS

| | | | | |
|---|---|---|---|---|
| 2015/0019152 | A1* | 1/2015 | Scheibenzuber | G01D 5/2448 702/94 |
| 2015/0343874 | A1* | 12/2015 | Kurata | B60G 17/0195 701/29.1 |
| 2018/0259375 | A1* | 9/2018 | Kiyomura | G01D 3/08 |

FOREIGN PATENT DOCUMENTS

| | | | | |
|---|---|---|---|---|
| JP | 2012-146488 | A | | 6/2012 |
| JP | 2015081562 | A * | 4/2015 | ............ F02D 15/02 |
| JP | 2016-135283 | A | | 7/2015 |
| JP | 2015-141031 | A | | 8/2015 |
| WO | WO 2016/030948 | * | | 3/2016 |

OTHER PUBLICATIONS

Japanese language International Search Report (PCT/ISA/210) issued in PCT Application No. PCT/JP2017/021505 with English translation dated Aug. 1, 2017 (two (2) pages).

Japanese-language Written Opinion (PC/ISA/237) issued in PCT Application No. PCT/JP2017/021505 with English translation dated Aug. 1, 2017 (six (6) pages).

International Preliminary Report on Patentability (PCT/IB/338 & PCT/IB/373) issued in PCT Application No. PCT/JP2017/021505 dated Dec. 20, 2018, including English translation of document C2 (Japanese-language Written Opinion (PCT/ISA/237) previously filed on Mar. 9, 2018) (10 pages).

Extended European search report issued in counterpart European Application No. 17810431.1 dated Nov. 26, 2019 (four (4) pages).

* cited by examiner ated from the two correlated signals is an angle that cannot be recognized to be 0°, 90°, 180°, or 270°.

Furthermore, according to the present invention, a control apparatus for an actuator that rotates a rotating body, the control apparatus controlling the actuator so that a rotational angle of the rotating body obtained from an output value of a rotational angle sensor that outputs two correlated signals, corresponding to the rotational angle of the rotating body, converges to a target angle, determines whether or not a failure has occurred in the rotational angle sensor based on whether or not a numerical value obtained from the two correlated signals is within the predetermined range. Then, in a case in which the control apparatus for the actuator determines that the failure has occurred in the rotational angle sensor, the control apparatus cancels the determination that the failure has occurred in the rotational angle sensor, when the numerical value is within the predetermined range and the rotational angle obtained from the two correlated signals is an angle that cannot be recognized to be 0°, 90°, 180°, or 270°.

Effects of the Invention

According to the present invention, it is possible to improve normality determination accuracy of the rotational angle sensor.

DIAGNOSTIC APPARATUS AND DIAGNOSTIC METHOD FOR ROTATIONAL ANGLE SENSOR, AND CONTROL APPARATUS FOR ACTUATOR

TECHNICAL FIELD

The present invention relates to a diagnostic apparatus and a diagnostic method for a rotational angle sensor, and a control apparatus for an actuator.

BACKGROUND ART

Regarding a rotational angle sensor, as disclosed in JP 2012-145488 A (Patent Document 1), a technique for diagnosing a failure in the rotational angle sensor based on whether or not a sum of a square of a sine wave signal (sin θ) and a square of a cosine wave signal (cos θ) corresponding to a rotational angle θ of a rotating body (i.e., $\sin^2 \theta + \cos^2 \theta$) is within a normal range, has been proposed.

REFERENCE DOCUMENT LIST

Patent Document

Patent Document 1: JP 2012-145488 A

SUMMARY OF THE INVENTION

Problem to be Solved by the Invention

In such a failure diagnostic technique, there might be a concern that if noise is overlapped on a sine wave signal or a cosine wave signal, for example, the sum of squares thereof may temporarily move out of a normal range and the rotational angle sensor may be diagnosed as having failed despite the rotational angle sensor being normal. Once the rotational angle sensor is diagnosed as having failed, a system to be controlled is transferred to fail-safe operation. Thus, it is desired to immediately decide whether this diagnosis was erroneous and cancel the fail-safe operation. However, since the normal range is set taking into account variation in generating circuits or the like of the sine and cosine wave signals, it is difficult to decide whether the rotational angle sensor is normal only by comparing the sum of squares with the normal range.

Thus, an object of the present invention is to provide a diagnostic apparatus and a diagnostic method for a rotational angle sensor, and to provide a control apparatus for an actuator, which improve normality determination accuracy of the rotational angle sensor.

Means for Solving the Problem

Thus, according to the present invention, a diagnostic apparatus for a rotational angle sensor that outputs two correlated signals, corresponding to a rotational angle, determines whether or not a failure has occurred in the rotational angle sensor based on whether or not a numerical value obtained from the two correlated signals is within a predetermined range. Then, in a case in which the diagnostic apparatus for the rotational angle sensor determines that the failure has occurred in the rotational angle sensor, the diagnostic apparatus cancels the determination that the failure has occurred in the rotational angle sensor, when the numerical value is within the predetermined range and the rotational angle obtained from the two correlated signals is an angle that cannot be recognized to be 0°, 90°, 180°, or 270°.

MODE FOR CARRYING OUT THE INVENTION

Hereinbelow, embodiments for implementing the present invention will be described in detail with reference to the accompanying drawings.

Figure 1:
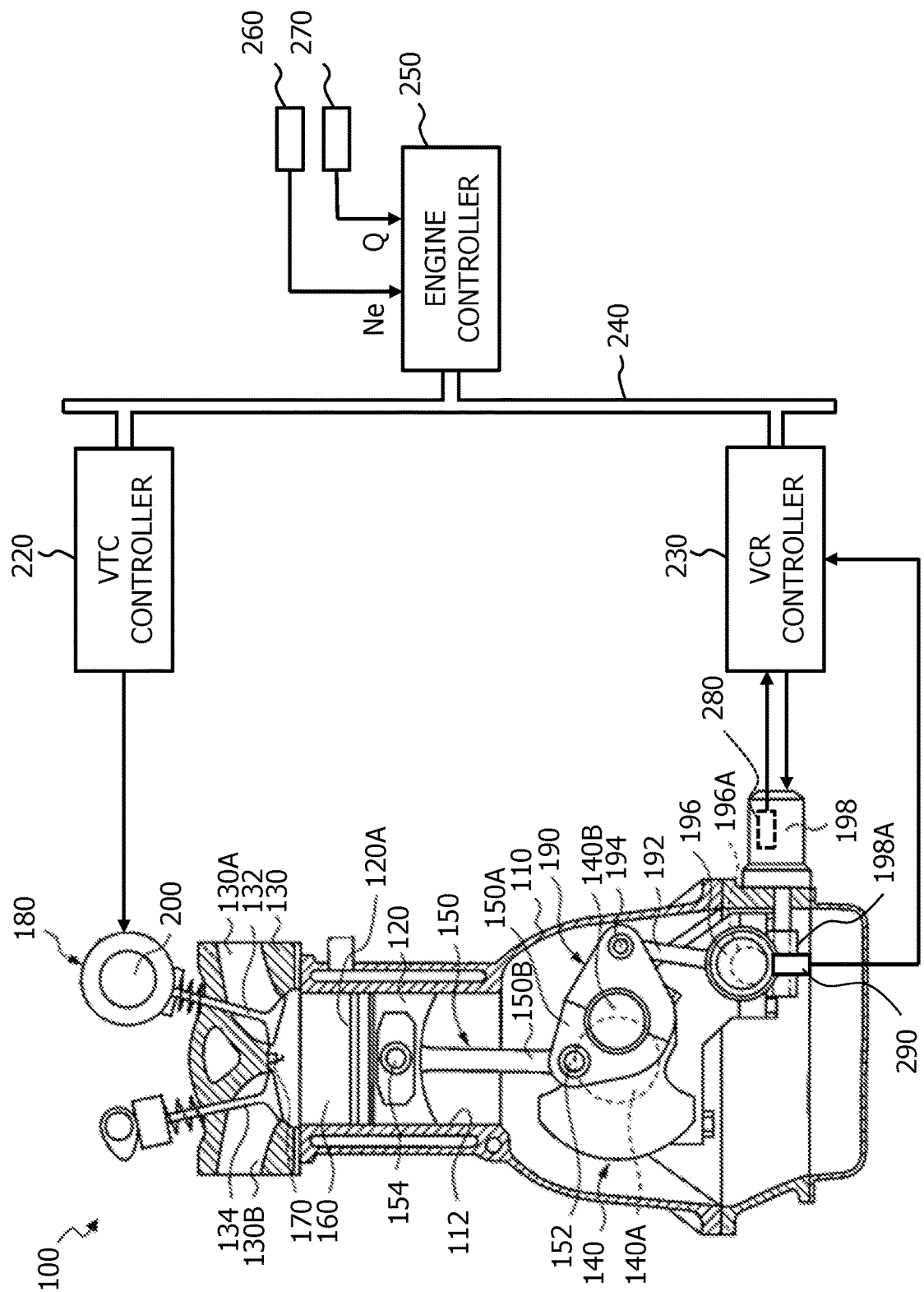
FIG. 1 is a system diagram illustrating an example of an internal combustion engine for use in a vehicle.

FIG. 1 illustrates an example of an internal combustion engine for use in a vehicle.

An internal combustion engine 100 includes a cylinder block 110, a piston 120 reciprocatably fitted in a cylinder bore 112 of cylinder block 110, a cylinder head 130 in which an intake port 130A and an exhaust port 130B are formed, and an intake valve 132 and an exhaust valve 134 that open and close opening ends of intake port 130A and exhaust port 130B.

Piston 120 is coupled to a crankshaft 140 via a con-rod (connecting rod) 150 including a lower link 150A and an upper link 150B. A combustion chamber 160 is formed between a top surface 120A of piston 120 and a lower surface of cylinder head 130. A spark plug 170 that ignites a mixture of fuel and air is attached to the approximate center of cylinder head 130 defining combustion chamber 160.

Furthermore, internal combustion engine 100 is provided with a variable valve timing (valve timing control, VTC) mechanism 180 that makes variable the phase of the open period of intake valve 132 relative to crankshaft 140, and a variable compression ratio (VCR) mechanism 190 that makes the compression ratio variable by changing the volume of combustion chamber 160.

For example, by changing the phase of an intake camshaft 200 relative to crankshaft 140 using an actuator such as an electric motor, VTC mechanism 180 advances or retards the center phase of the operating angle of intake valve 132 while keeping the operating angle of intake valve 132 constant. But it is not limited to the phase of intake valve 132, and VTC mechanism 180 may make variable the phase of at least one of intake valve 132 and exhaust valve 134.

By changing the volume of combustion chamber 160 using a multi-link mechanism, for example, like one disclosed in JP 2002-276446 A, VCR mechanism 190 makes the compression ratio of internal combustion engine 100 variable. Hereinbelow, an example of VCR mechanism 190 will be described.

Crankshaft 140 includes a plurality of journal portions 140A and a plurality of crank pin portions 140B. Journal portions 140A are rotatably supported by main bearings (not illustrated) of cylinder block 110. Crank pin portions 140B are eccentric from journal portions 140A, and lower link 150A is rotatably coupled to each of crank pin portions 140B. Upper link 150B has a lower end side pivotally coupled to one end of lower link 150A by a coupling pin 152 and has an upper end side pivotally coupled to piston 120 by a piston pin 154. A control link 192 has an upper end side pivotally coupled to the other end of lower link 150A by a coupling pin 194 and has a lower end side pivotally coupled to a lower portion of cylinder block 110 via a control shaft 196. Specifically, control shaft 196 is rotatably supported by the engine body (cylinder block 110) and has an eccentric cam portion 196A that is eccentric from the rotation center of control shaft 196, while a lower end side of control link 192 is rotatably fitted on eccentric cam portion 196A. The rotational position of control shaft 196 is controlled by a compression ratio control actuator 198 that uses an electric motor.

In VCR mechanism 190 using such a multi-link mechanism, when control shaft 196 is rotated by compression ratio control actuator 198, the center position of eccentric cam portion 196A, that is, the relative position of eccentric cam portion 196A to the engine body (cylinder block 110), changes. When the pivotal support position of the lower end of control link 192 is changed by this, the position of piston 120 at the piston top dead center (TDC) becomes higher or lower, so that the volume of combustion chamber 160 increases or decreases, to change the compression ratio of internal combustion engine 100. In this event, when the operation of compression ratio control actuator 198 is stopped, control link 192 is rotated relative to eccentric cam portion 196A of control shaft 196 by reciprocating motion of piston 120, so that the compression ratio shifts to the low compression ratio side.

Figure 2:
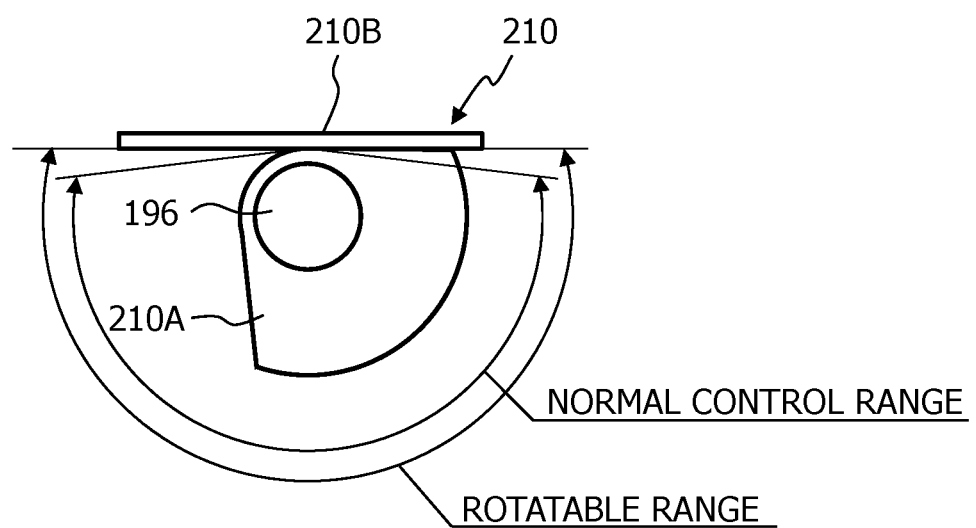
FIG. 2 is a partial enlarged view illustrating an example of a stopper mechanism.

As illustrated in FIG. 2, a stopper mechanism 210, which restricts the displacement (rotation) of control shaft 196 when control shaft 196 is rotated beyond a normal control range, is attached to VCR mechanism 190. Stopper mechanism 210 includes a substantially fan-shaped first member 210A, the pivot portion of which is secured to control shaft 196, and a plate-shaped second member 210B secured to cylinder block 110. First member 210A rotates integrally with control shaft 196. When control shaft 196 rotates beyond a maximum compression ratio (upper limit) or a minimum compression ratio (lower limit), defining the normal control range, second member 210B comes in contact with one of two sides defining a central angle of first member 210A, so as to restrict the displacement of control shaft 196, which is one example of a mechanism member. Herein, since stopper mechanism 210 functions when control shaft 196 has exceeded the normal control range, first member 210A and second member 210B do not come in contact with each other in normal control, so that, for example, it is possible to reduce the occurrence of abnormal noise or the like. Stopper mechanism 210 may be used not only for restricting the displacement of control shaft 196, but also for learning a reference position of control shaft 196.

Stopper mechanism 210 is sufficient if it can restrict the displacement on at least one of the maximum compression ratio side and the minimum compression ratio side with respect to the rotation of control shaft 196. Furthermore, stopper mechanism 210 is sufficient if it can restrict the displacement of control shaft 196 by at least two members, and such two members are not limited to substantially fan-shaped first member 210A and plate-shaped second member 210B, and may have other shapes.

VTC mechanism 180 and VCR mechanism 190 are electronically controlled by a VTC controller 220 and a VCR controller 230, respectively, each incorporating a processor such as a microcomputer. VTC controller 220 and VCR controller 230 are connected to an engine controller 250, incorporating a processor such as a microcomputer and configured to electronically control internal combustion engine 100, via, for example, a controller area network (CAN) 240 being one example of an in-vehicle network. Therefore, freely chosen data can be sent and received via CAN 240 between VTC controller 220, VCR controller 230, and engine controller 250. The in-vehicle network is not limited to CAN 240, and any known network such as FlexRay (registered trademark) may be used.

To engine controller 250, output signals of a rotational speed sensor 260 that measures rotational speed Ne of internal combustion engine 100, and a load sensor 270 that measures load Q of internal combustion engine 100 are input, as examples of operating states of internal combustion engine 100. Herein, as load Q of internal combustion engine 100, a state quantity closely related to torque, such as intake negative pressure, intake flow rate, supercharging pressure, accelerator opening degree, throttle opening degree, or the like, may be used. For example, engine controller 250 refers to maps in which target values matching rotational speeds and loads are set, and calculates a target angle of VTC mechanism 180 and a target compression ratio of VCR mechanism 190 corresponding to rotational speed Ne and load Q of internal combustion engine 100, respectively. Then, engine controller 250 sends the target angle and the target compression ratio to VTC controller 220 and VCR controller 230, respectively, via CAN 240. Output signals read by engine controller 250 are not limited to the output signals of rotational speed sensor 260 and load sensor 270, and engine controller 250 may read rotational speed Ne and load Q of internal combustion engine 100 from an additional controller (not illustrated) connected via CAN 240.

VTC controller 220 having received the target angle performs feedback control of a drive current to be output to the actuator of VTC mechanism 180 such that a real angle (actual angle) measured by a sensor (not illustrated) converges to the target angle. VCR controller 230 having received the target compression ratio performs feedback control of a drive current to be output to compression ratio control actuator 198 of VCR mechanism 190 such that a real compression ratio (actual compression ratio) that is measured by a compression ratio sensor described below converges to the target compression ratio. By doing this, VTC mechanism 180 and VCR mechanism 190 are controlled to the target values corresponding to the operating state of internal combustion engine 100.

The compression ratio sensor that measures an actual compression ratio of internal combustion engine 100 includes: a relative angle sensor 280 that measures a relative angle of an output shaft of compression ratio control actuator 198; and an absolute angle sensor 290 that measures an absolute angle of control shaft 196 coupled to the output shaft of compression ratio control actuator 198 via a speed reducer 198A. Using an output value of absolute angle sensor 290 at the start-up of the engine as a reference point, VCR controller 230 obtains a rotational angle of control shaft 196, that is, the compression ratio of internal combustion engine 100, from an output value of relative angle sensor 280. This is because relative angle sensor 280 has high resolution whereas, for example, it cannot distinguish between 0° and 360° of the same phase, and absolute angle sensor 290 can obtain an absolute angle of control shaft 196, although it has low resolution.

Figure 3:
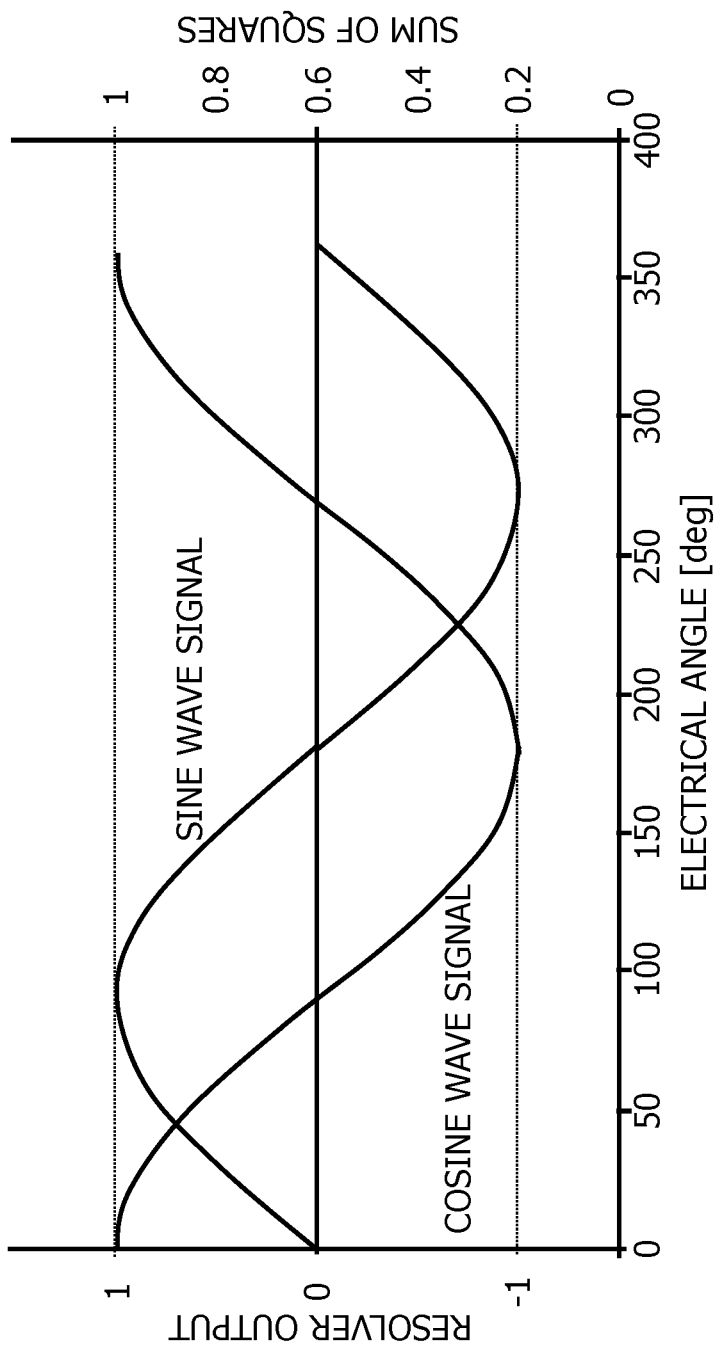
FIG. 3 is an explanatory view illustrating an example of a resolver output.

Each of relative angle sensor 280 and absolute angle sensor 290 includes a resolver, or the like, that outputs two correlated signals, corresponding to a rotational angle of a rotating body, more specifically, outputs a sine wave signal and a cosine wave signal. For example, the resolver includes a rotor that integrally rotates with the rotating body, and a stator with one phase of an exciting coil wound thereon and two phases of output coils wound thereon. When an alternating voltage is applied to the exciting coil of the stator, a two-phase voltage with a sine wave signal and a cosine wave signal, which change in response to the rotational angle (electrical angle) of the rotating body, is generated in each output coil, as illustrated in FIG. 3.

Then, by calculating an arctangent of the sine and cosine wave signals output from the resolver, VCR controller 230 can obtain the rotational angle of the rotating body. Furthermore, VCR controller 230 obtains a sum of squares of the sine and cosine wave signals output from the resolver, and determines whether or not a failure has occurred in the resolver based on whether or not the sum of squares is within a normal range. Then, in a case in which VCR controller 230 determines that the failure has occurred in the resolver, VCR controller 230 cancels the determination that the failure has occurred in the resolver, when the sum of squares is within the normal range and the rotational angle of the rotating body is an angle that cannot be recognized to be 0°, 90°, 180°, or 270°. Herein, VCR controller 230 functions as a diagnostic apparatus for the rotational angle sensor, and a control apparatus for the actuator.

Since generating circuits and processing circuits of the sine and cosine wave signals of the resolver include variation, which is inherent in each circuit, the sum of squares of the sine and cosine wave signals does not always give a unique value ($\sin^2 \theta + \cos^2 \theta = 1$) even when the resolver operates normally. Thus, taking into account such variation in the generating circuits and the processing circuits, an upper threshold and a lower threshold, defining the normal range, are set by adding to or subtracting from the unique value a predetermined value, for example.

Figure 4:
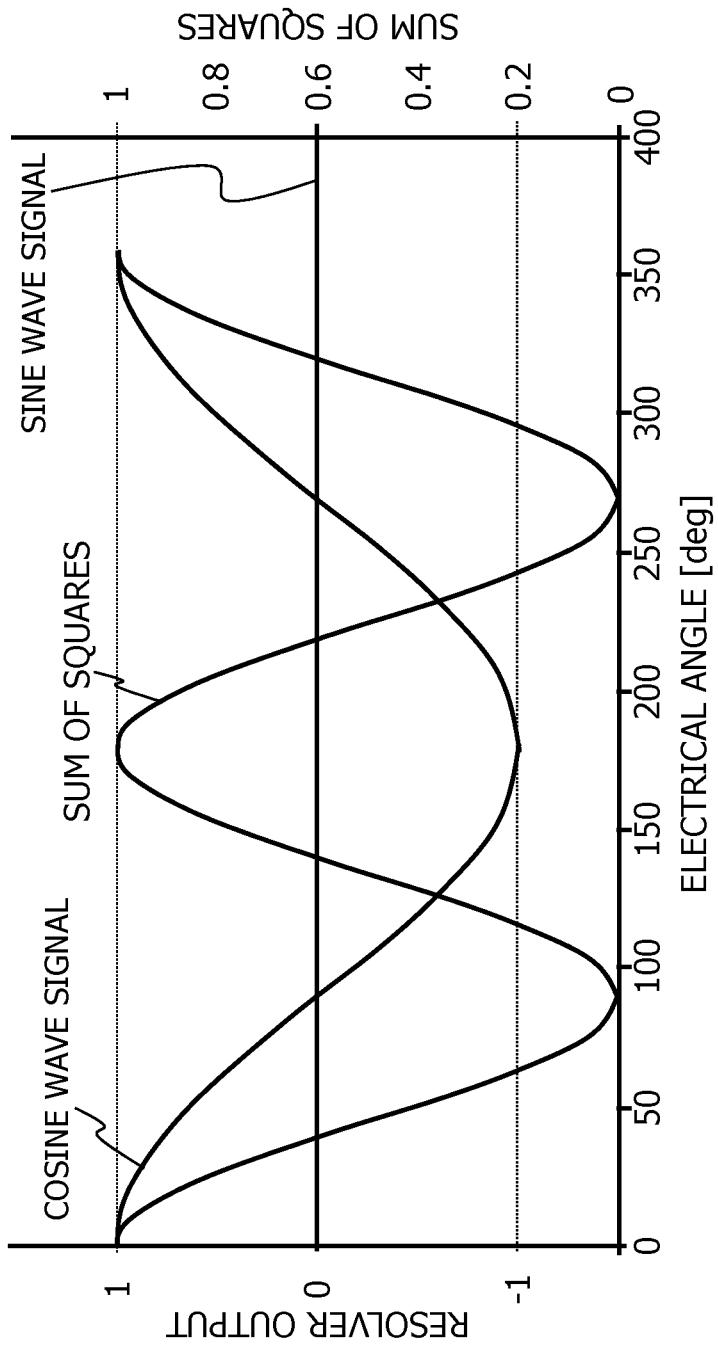
FIG. 4 is an explanatory view of the resolver output and a sum of squares when a sine wave signal is abnormal.
Figure 5:
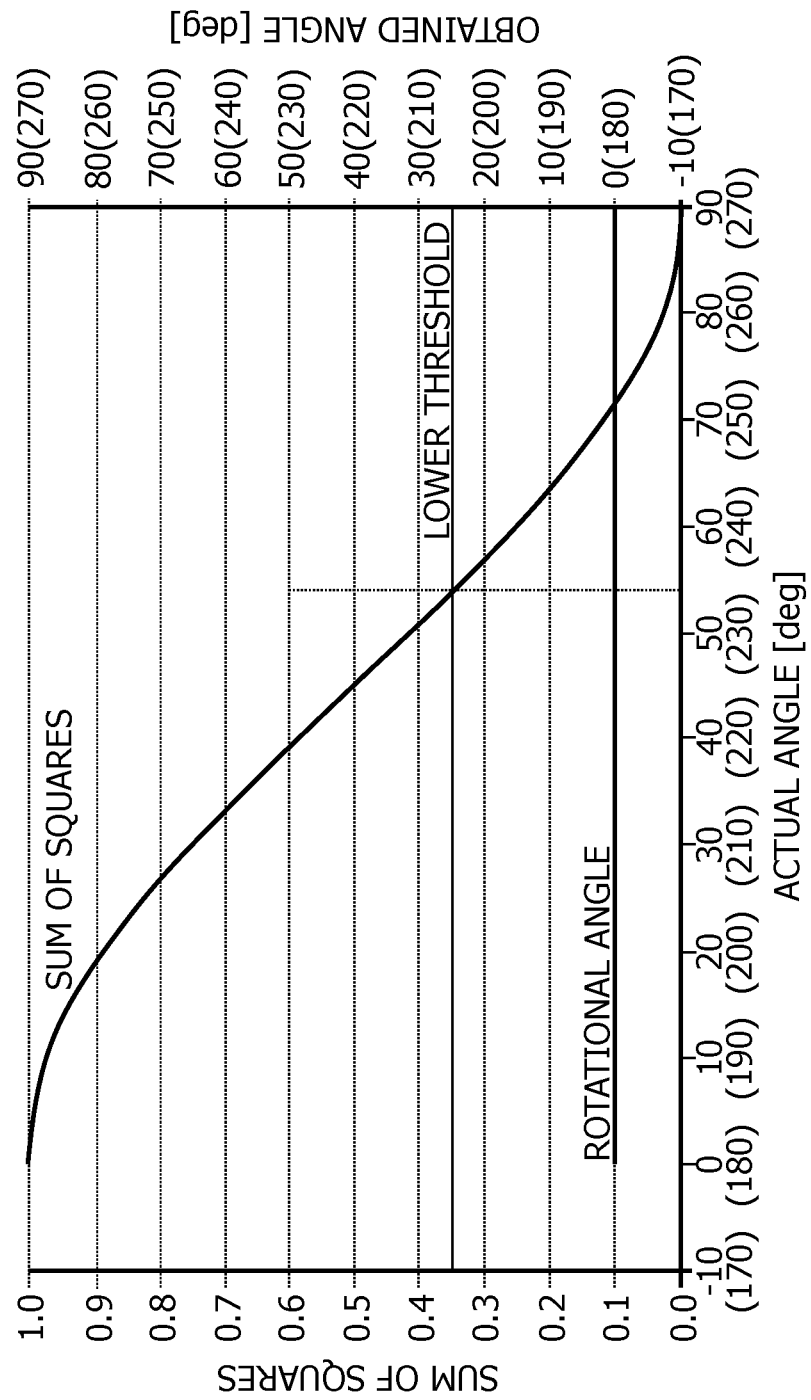
FIG. 5 is an explanatory view of the sum of squares and a rotational angle when the sine wave signal is abnormal.

When a failure has occurred in the output coil of the resolver, and then the sine wave signal always becomes zero, as illustrated in FIG. 4, the sum of squares of the sine and cosine wave signals appears to be a cosine wave form that changes in a period half of that of the cosine wave signal. In this case, since the sine wave signal is always zero, the rotational angle of the rotating body obtained from the arctangent of the sine and cosine wave signals always becomes 0° or 180°, as illustrated in FIG. 5. Thus, the rotational angle of the rotating body remains at 0° or 180° even when the sum of squares of the sine and cosine wave signals is greater than or equal to the lower threshold, that is, within the normal range, and thus, it will be understood that the normality determination accuracy is insufficient. It should be noted that the same applies to a case in which the sum of squares of the sine and cosine wave signals is less than or equal to the upper threshold, that is, within the normal range (the same applies hereinbelow).

Figure 6:
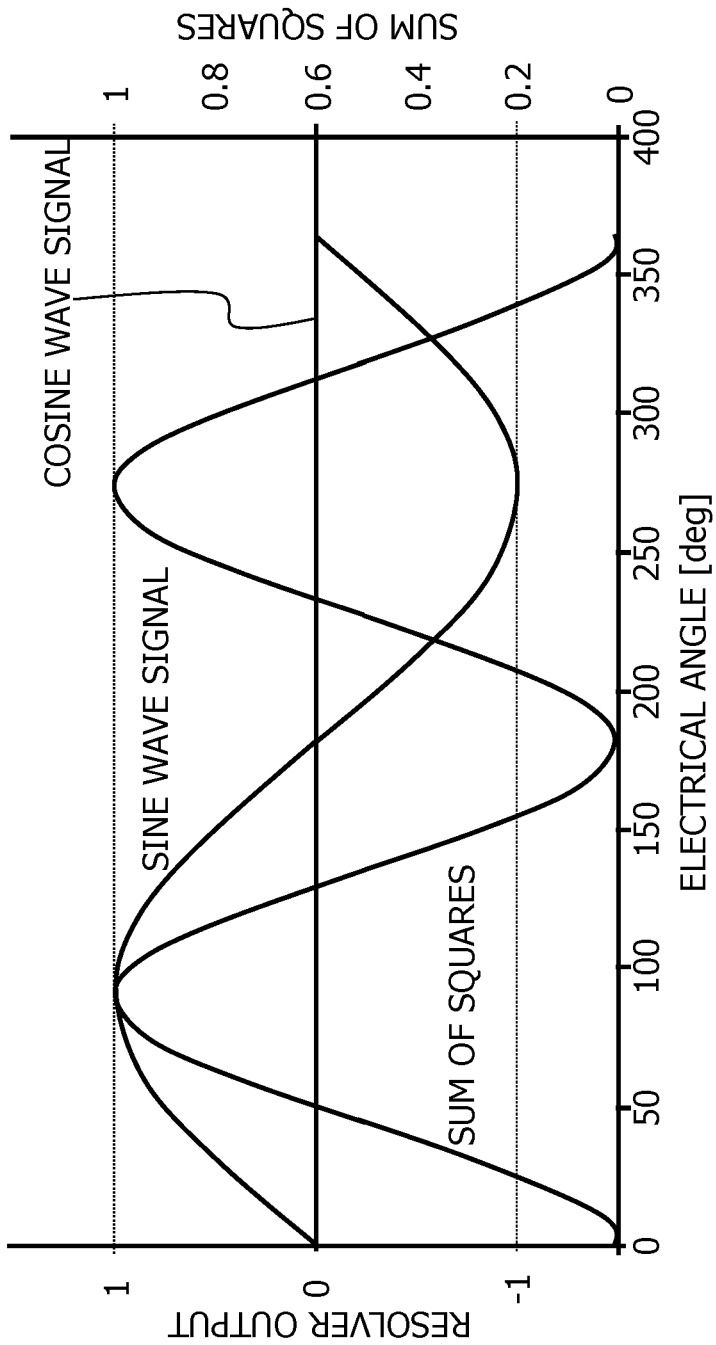
FIG. 6 is an explanatory view of the resolver output and the sum of squares when a cosine wave signal is abnormal.
Figure 7:
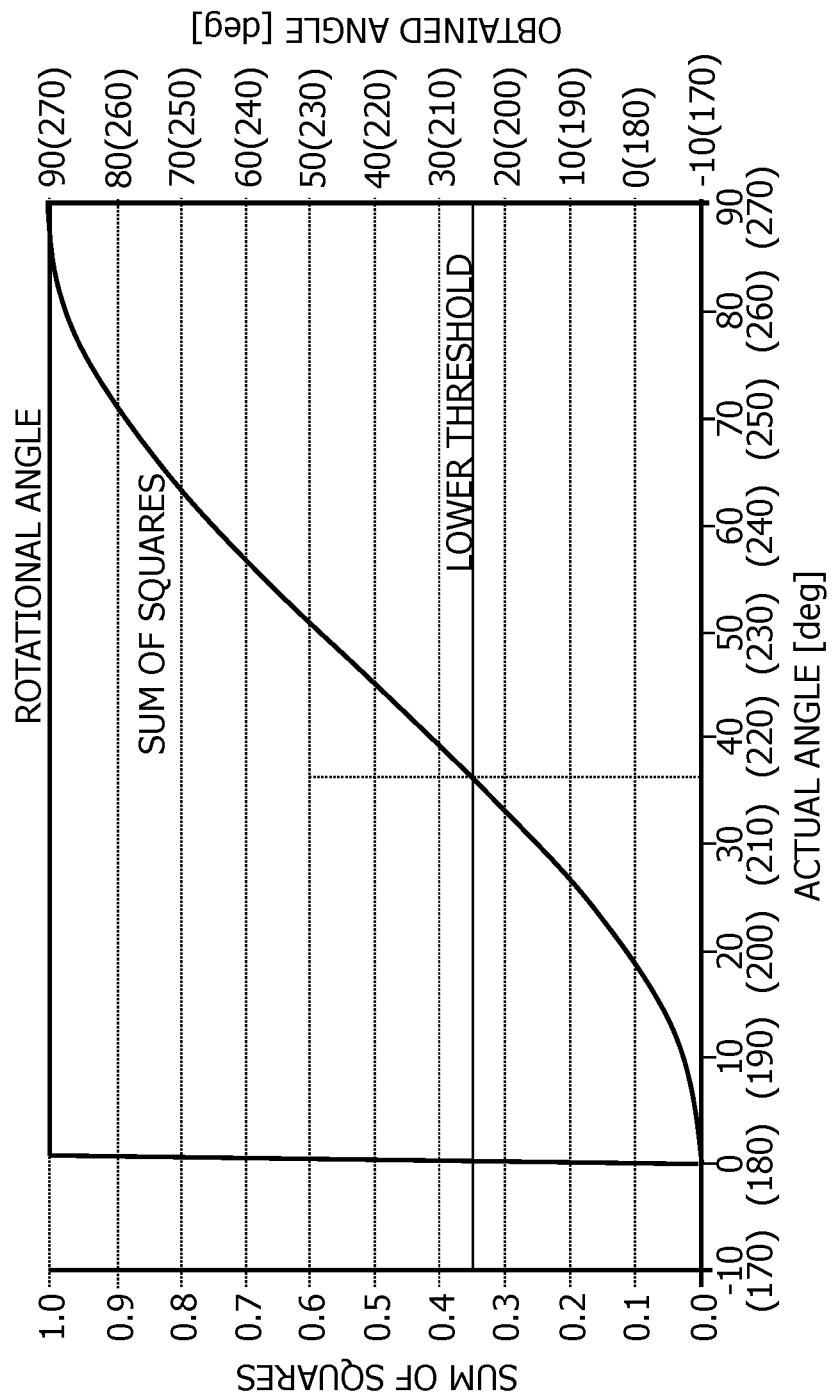
FIG. 7 is an explanatory view of the sum of squares and the rotational angle when the cosine wave signal is abnormal.

On the other hand, when a failure has occurred in the output coil of the resolver, and then the cosine wave signal always becomes zero, as illustrated in FIG. 6, the sum of squares of the sine and cosine wave signals appears to be a sine wave form that changes in a period half of that of the sine wave signal. In this case, since the cosine wave signal is always zero, the rotational angle of the rotating body obtained from the arctangent of the sine and cosine wave signals always becomes 90° or 270°, as illustrated in FIG. 7. Thus, the rotational angle of the rotating body remains at 90° or 270° even when the sum of squares of the sine and cosine wave signals is greater than or equal to the lower threshold, that is, within the normal range, and thus, it will be understood that the normality determination accuracy is insufficient.

Figure 8:
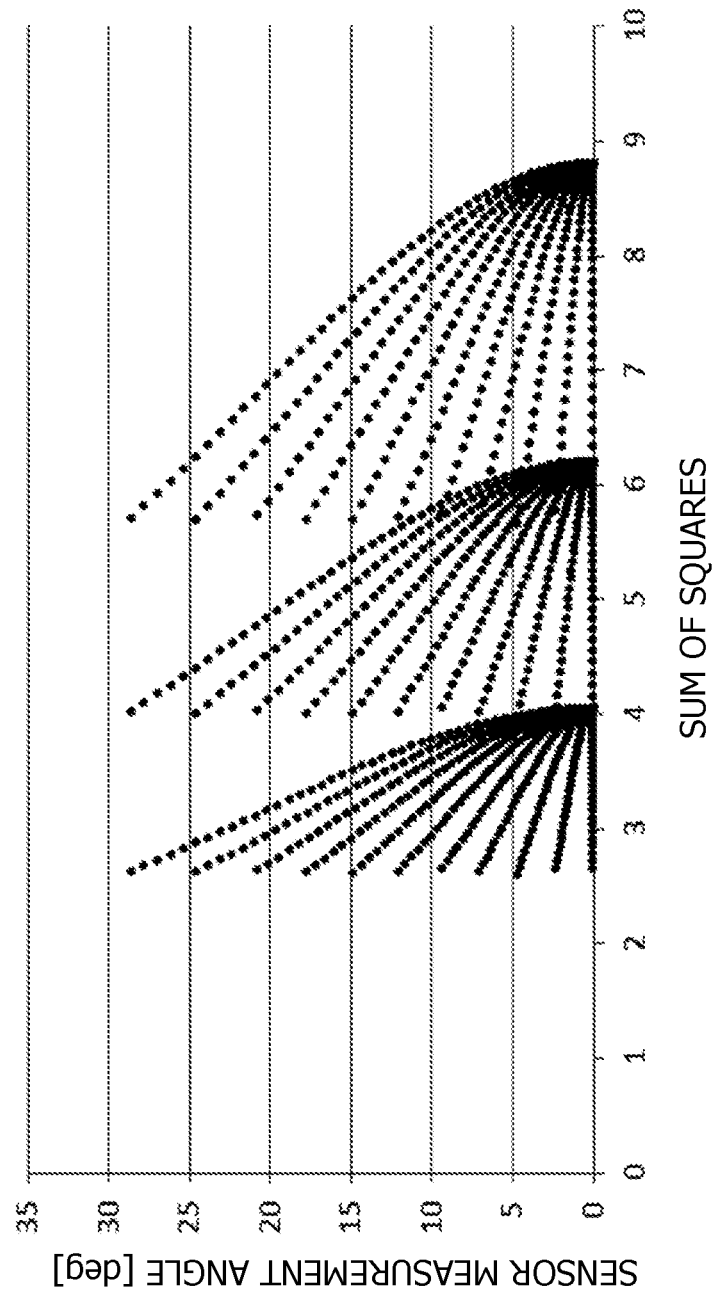
FIG. 8 is an explanatory view of an actually measured value of the rotational angle when the sine wave signal is abnormal.
Figure 9:
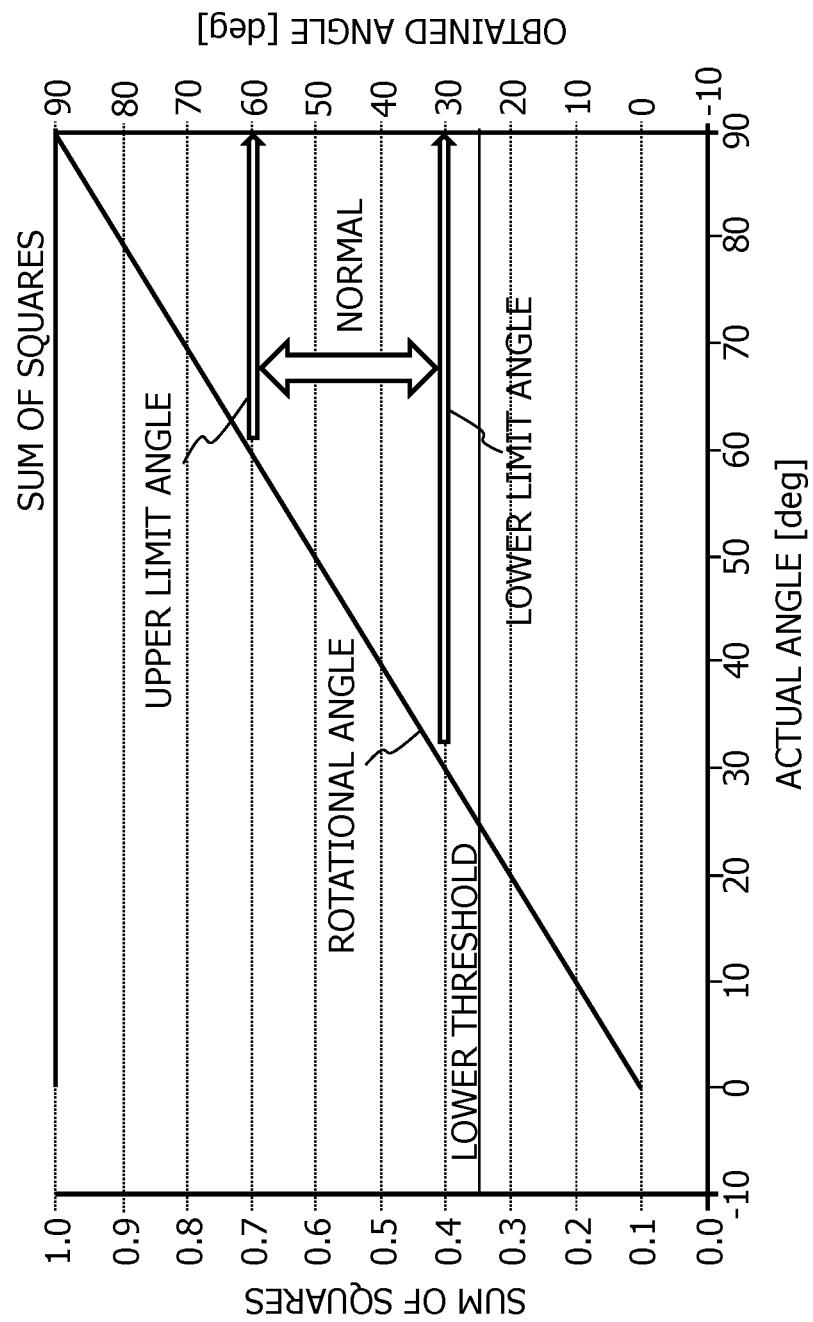
FIG. 9 is an explanatory view of the rotational angle obtained when the resolver is normal.

It has been found that, in a case in which the sine wave signal of the resolver is abnormal, and when the rotational angle of the rotating body obtained from the arctangent of the sine and cosine wave signals is actually measured in a range of from 0° to 90°, the rotational angle varies in a range of from 0° to 28°, as illustrated in FIG. 8. It has also been found that, in a case in which the cosine wave signal of the resolver is abnormal, the rotational angle of the rotating body obtained from the arctangent of the sine and cosine wave signals similarly varies in a range of from 62° to 90°. Thus, when taking into account the variation or the like of resolver, it will be understood that in a case in which the resolver is normal, there is a high probability that the rotational angle of the rotating body obtained from the arctangent of the sine and cosine wave signals is within a range of from 30° to 60°, as illustrated in FIG. 9. Also in a range of 90° to 360° of the rotational angle of the rotating body, it will be similarly understood that there is a high probability that the rotational angle of the rotating body is within a range of from 120° to 150°, from 210° to 240°, or from 300° to 330°, in a case in which the resolver is normal.

Thus, in a case in which the determination that a failure has occurred in the resolver was made, it is possible to determine that the determination was erroneously made due to overlapping of noise, or the like, when the sum of squares of the sine and cosine wave signals is within the normal range and the rotational angle of the rotating body obtained from the arctangent of the sine and cosine wave signals is within a range of from 30° to 60°, from 120° to 150°, from 210° to 240°, or from 300° to 330°. Herein, the range of from −30° (330° to 30° of the rotational range of the rotating body is given as an example of angles that cannot be recognized that the rotational angle is 0°. Furthermore, the ranges of from 60° to 120°, from 150° to 210°, and from 240° to 300° are also given as examples of the angles that cannot be recognized that the rotational angle is 90°, 180°, and 270°, respectively.

Figure 10:
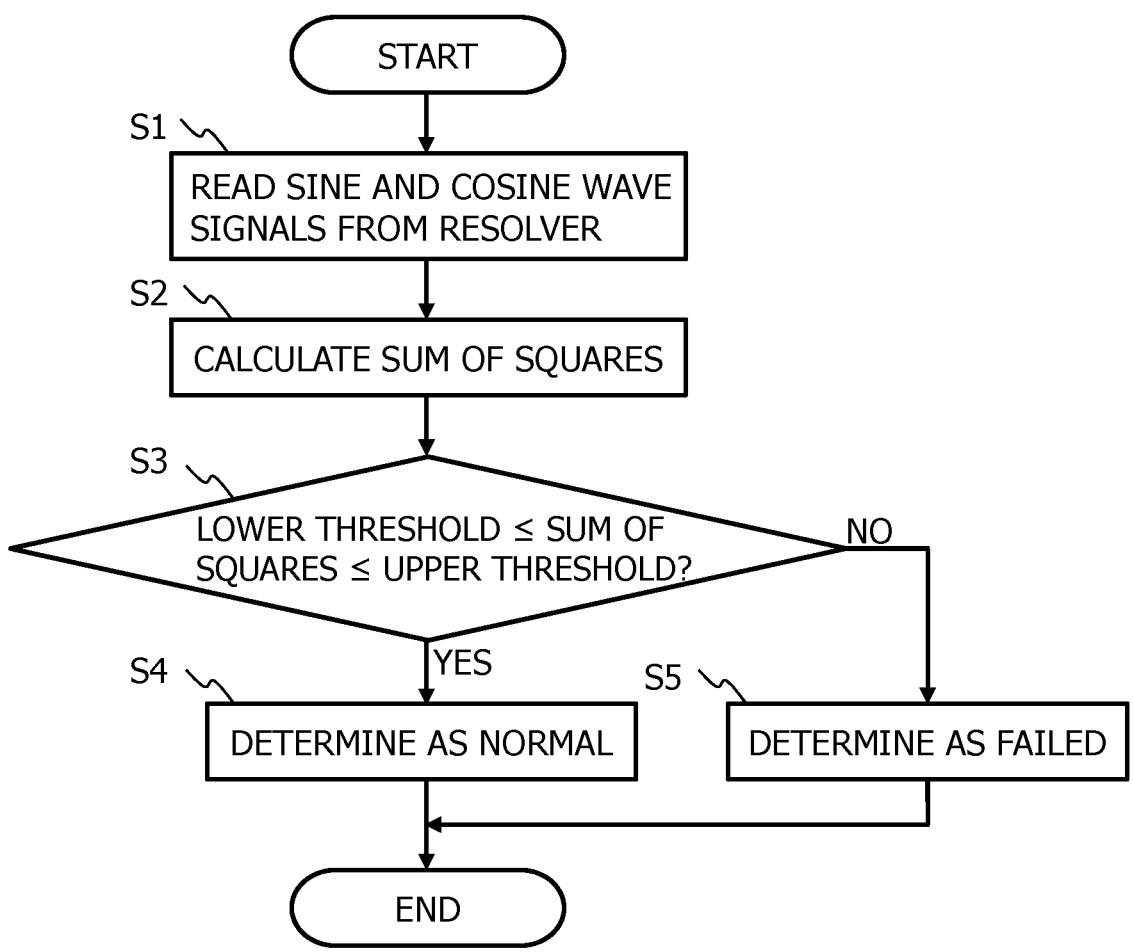
FIG. 10 is a flowchart illustrating an example of a failure determination process.

FIG. 10 illustrates an example of the failure determination process repeatedly executed by a processor of VCR controller 230 at every first predetermined time after the startup of VCR controller 230. In the following description, since it is not necessary to distinguish relative angle sensor 280 and absolute angle sensor 290, these sensors will be referred to as the "resolver". The execution of the failure determination process is terminated when it is determined that a failure has occurred in the resolver.

In step 1 (abbreviated as "S1" in FIG. 10; the same applies hereinafter), the processor of VCR controller 230 reads sine and cosine wave signals from the resolver.

In step 2, the processor of VCR controller 230 calculates sum of squares of the sine and cosine wave signals.

In step 3 the processor of VCR controller 230 determines whether or not the sum of squares of the sine and cosine wave signals is greater than or equal to the lower threshold and less than or equal to the upper threshold, that is, whether or not the sum of squares is within the normal range. Then, when the processor of VCR controller 230 determines that the sum of squares is greater than or equal to the lower threshold and less than or equal to the upper threshold, the process proceeds to step 4 (Yes), whereas when the processor determines that the sum of squares is less than the lower threshold or greater than the upper threshold, the process proceeds to step 5 (No).

In step 4, the processor of VCR controller 230 determines that the resolver is normal, that is, no failure has occurred in the resolver.

In step 5, the processor of VCR controller 230 determines that a failure has occurred in the resolver.

According to this failure determination process, whether or not a failure has occurred in the resolver is determined based on whether or not the sum of squares of the sine and cosine wave signals output from the resolver is within the normal range. Specifically, when the sum of squares of the sine and cosine wave signals is within the normal range, it is determined that the resolver is normal, whereas when the sum of squares is out of the normal range, it is determined that the resolver has failed.

When determining that the resolver has failed, the processer of VCR controller 230 may output a control signal to compression ratio control actuator 198 of VCR mechanism 190, to cause the transition to fail-safe operation, in which the compression ratio of internal combustion engine 100 is changed to the minimum compression ratio. Furthermore, when determining that the resolver has failed, the processer of VCR controller 230 may shift the rotational angle of the rotating body obtained from the arctangent of the sine and cosine wave signals of the resolver, into the normal range at a freely chosen timing (for example, while the engine is stopped).

Figure 11:
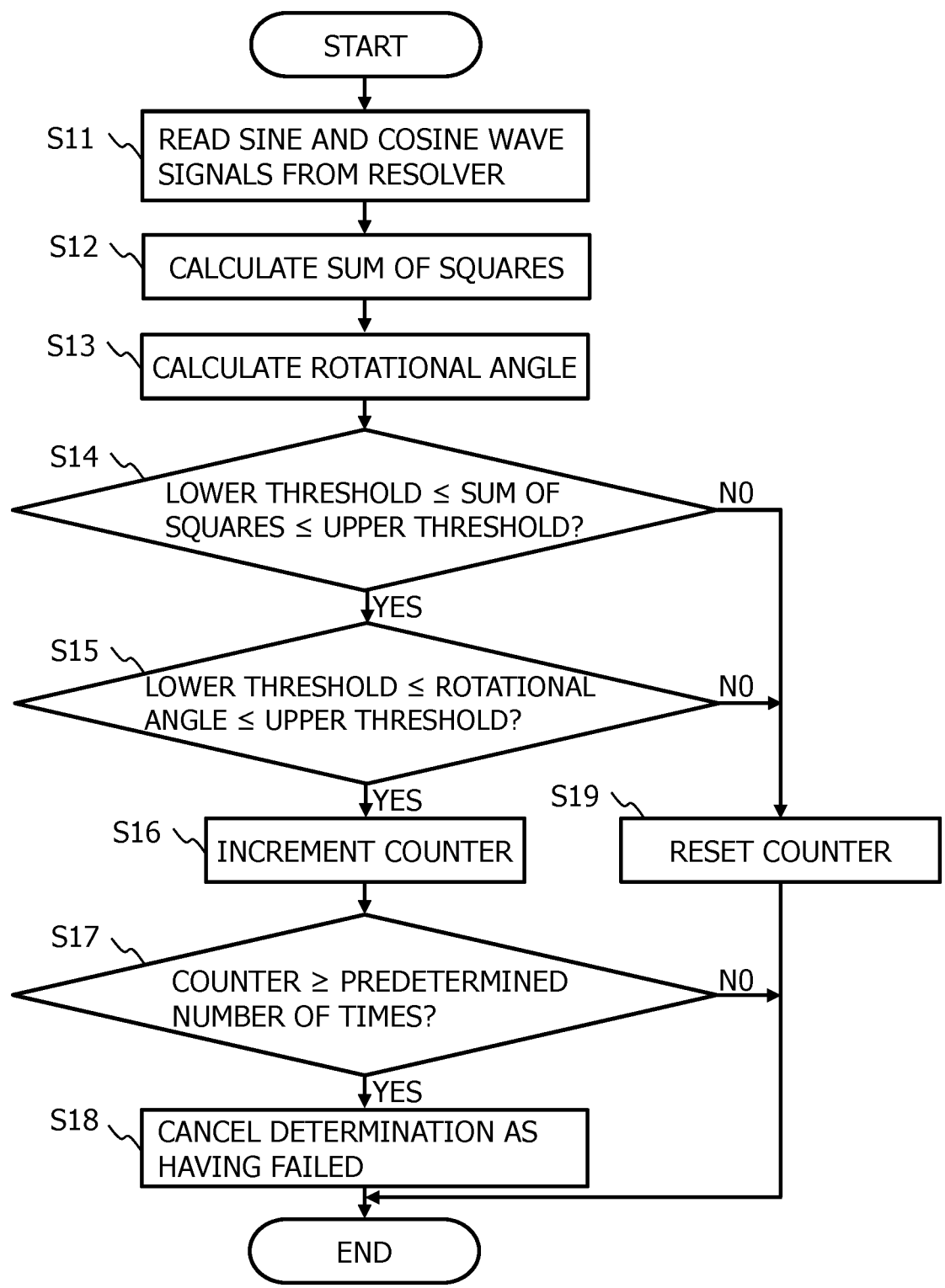
FIG. 11 is a flowchart illustrating an example of a failure determination cancelling process.
Figure 12:
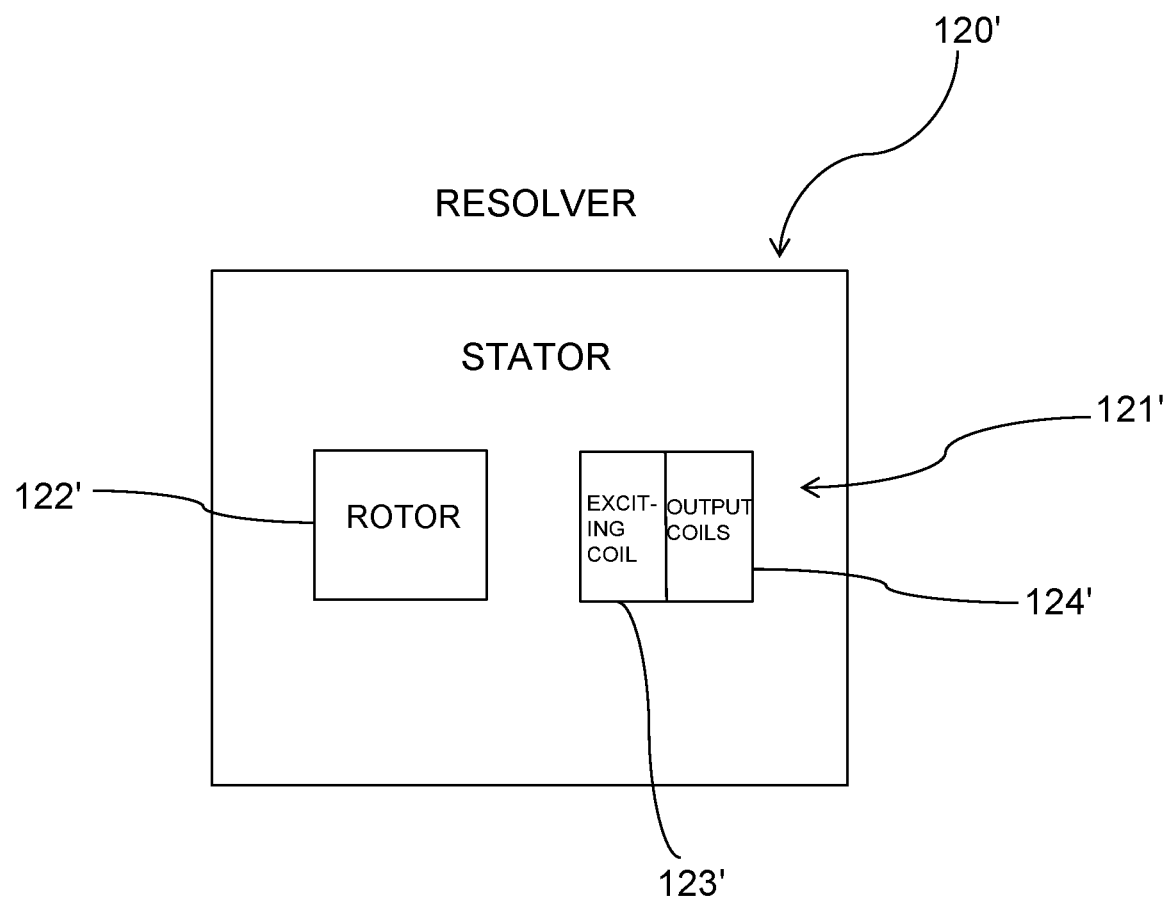
FIG. 12 is a diagram illustrating an embodiment of a resolver.

FIG. 11 illustrates an example of the failure determination cancelling process repeatedly executed by the processor of VCR controller 230 at every second predetermined time after the processor determined that the resolver has failed. Herein, the second predetermined time may be the same as the first predetermined time, or alternatively, may be different from the first predetermined time. The execution of the failure determination cancelling process is terminated when the determination indicating that the resolver has failed is cancelled.

In step 11, the processor of VCR controller 230 reads sine and cosine wave signals from the resolver.

In step 12, the processor of VCR controller 230 calculates sum of squares of the sine and cosine wave signals.

In step 13, the processor of VCR controller 230 calculates an arctangent of the sine and cosine wave signals, to obtain the rotational angle of the rotating body.

In step 14, the processor of VCR controller 230 determines whether or not the sum of squares of the sine and cosine wave signals is greater than or equal to the lower threshold and less than or equal to the upper threshold. Then, when the processor of VCR controller 230 determines that the sum of squares is greater than or equal to the lower threshold and less than or equal to the upper threshold, the process proceeds to step 15 (Yes), whereas when the processor determines that the sum of squares is less than the lower threshold or greater than the upper threshold, the process proceeds to step 19 (No).

In step 15, the processor of VCR controller 230 determines whether or not the rotational angle of the rotating body is greater than or equal to a lower limit angle and less than or equal to an upper limit angle, that is, whether or not the rotational angle of the rotating body is within a range of from 30° to 60°, from 120° to 150°, from 210° to 240°, or from 300° to 330°. Then, when the processor determines that the rotational angle of the rotating body is greater than or equal to the lower limit angle and less than or equal to the upper limit angle, the process proceeds to step 16 (Yes), whereas when the processor determines that the rotational angle of the rotating body is less than the lower limit angle or greater than the upper limit angle, the process proceeds to step 19 (No).

In step 16, the processor of VCR controller 230 increments a counter that counts the number of times it is determined that the sum of squares is within the normal range and the rotational angle is within the predetermined angle range. The counter is reset to zero when it is determined that a failure has occurred in the resolver.

In step 17, the processor of VCR controller 230 determines whether or not the counter indicates a number that is greater than or equal to a predetermined number of times. Herein, the predetermined number of times is a threshold for eliminating a case in which the requirement, that is, the sum of squares is within the normal range and the rotational angle is within the predetermined angle range, happens to be satisfied for some reason, and the predetermined number of times may be a constant such as two or more. Preferably, this predetermined number of times may be stored in a nonvolatile memory such as a flash ROM (read only memory), to allow the predetermined number of times to be rewritable in response to an external instruction. Then, when the processor of VCR controller 230 determines that the counter indicates a number that is greater than or equal to the predetermined number of times, the process proceeds to step 18 (Yes), whereas when the processor determines that the counter indicates a number that is less than the predetermined number of times, the process ends (No).

In step 18, the processor of VCR controller 230 cancels the determination that the failure has occurred in the resolver. When the determination that the failure has occurred in the resolver is cancelled, the failure determination process is executed again.

In step 19, the processor of VCR controller 230 resets the counter to zero.

By the failure determination cancelling process, after it is determined that the failure has occurred in the resolver, and when the sum of squares of the sine and cosine wave signals is within the normal range, and in addition, the rotational angle of the rotating body obtained from the arctangent of the sine and cosine wave signals is within the predetermined angle range, then it is determined that there is a possibility of erroneously determining that the failure has occurred in the resolver. Then, when the requirement described above is satisfied consecutively for a predetermined number of times, it is decided that the determination that the failure has occurred in the resolver was erroneously made, and the determination that the failure has occurred is cancelled. Thus, it is possible to improve the normality determination accuracy of the resolver. Alternatively, it may be decided that the determination that the failure has occurred in the resolver was erroneously made, when the requirement described above is satisfied once, without using the counter.

Furthermore, since the determination that the failure has occurred can be cancelled when the requirement described above is satisfied even when it is determined that the resolver has failed due to, for example, the overlap of noise on the sine or cosine wave signal, despite the resolver being normal, it is possible to reduce the fail-safe operation of a system to be controlled by VCR mechanism 190, or the like. Thus, the controllability of the system to be controlled can be improved, resulting in, for example, improved fuel economy, improved drivability, and the like.

Although, in the above embodiment, a method of diagnosing a failure of relative angle sensor 280 and absolute angle sensor 290, serving as the rotational angle sensors, has been described, the rotational angle sensor may be any rotational angle sensor that uses a resolver or the like. Furthermore, although the processor of VCR controller 230 plays a major role in diagnosing a failure of the rotational angle sensor, this is not limited thereto, and any processor for failure diagnosis, any processor of another controller, a dedicated circuit, or the like, may be used.

The rotational angle sensor is a resolver 120' comprising a rotor 122' that rotates integrally with a rotational body, and a stator 121' with one phase of an exciting coil 123' and two phases of output coils 124'.

REFERENCE SYMBOL LIST

230 VCR controller
280 Relative angle sensor
290 Absolute angle sensor

The invention claimed is:

1. A diagnostic apparatus for a rotational angle sensor that outputs two correlated signals which change in response to a rotational angle, the diagnostic apparatus comprising:
a processor, wherein
the processor is configured to determine whether or not a failure has occurred in a rotational angle sensor based on whether or not a numerical value obtained from the two correlated signals is within a predetermined range and the processor is configured to determine that the failure determination has been erroneously made when the numerical value is within the predetermined range and the rotational angle is within a range of from 30° to 60°, 120° to 150°, 210° to 240°, or from 300° to 330°,
the two correlated signals are a sine wave signal and a cosine wave signal, respectively,
the numerical value is a sum of squares of the sine and cosine wave signals,
the rotational angle is obtained by calculating an arctangent of the sine and cosine wave signals,
the processor is configured to read the two correlated signals,
the numerical value and the rotational angle are calculated by the processor based on the two correlated signals, and
the rotational angle sensor is a resolver comprising a rotor that rotates integrally with a rotational body, and a stator with one phase of an exciting coil and two phases of output coils.

2. The diagnostic apparatus for the rotational angle sensor, according to claim 1, wherein the processor is configured to determine that the failure has not occurred when a requirement that the numerical value is within the predetermined range and the rotational angle obtained from the two correlated signals is within a range of from 30° to 60°, 120° to 150°, 210° to 240°, or from 300° to 330° and is satisfied consecutively for a predetermined number of times.

3. The diagnostic apparatus for the rotational angle sensor, according to claim 1, wherein when the numerical value is within the predetermined range, the processor is configured to determine that the rotational angle sensor is normal, whereas when the numerical value is out of the predetermined range, the processor is configured to determine that a failure has occurred in the rotational angle sensor.

4. The diagnostic apparatus for the rotational angle sensor, according to claim 1, wherein the rotational angle sensor measures a rotational angle of a control shaft or an actuator of a compression ratio varying mechanism that makes variable a compression ratio of an internal combustion engine.

5. A diagnostic method of a rotational angle sensor, comprising the steps of:
determining, using a processor, whether or not a failure has occurred in the rotational angle sensor based on whether or not a numerical value obtained from the two correlated signals is within a predetermined range, wherein the two correlated signals change in response to a rotational angle, and
determining, using the processor, that the failure determination has been erroneously made when the numerical value is within the predetermined range and the rotational angle is within a range of from 30° to 60°, 120° to 150°, 210° to 240°, or from 300° to 330°, wherein
the two correlated signals are a sine wave signal and a cosine wave signal, respectively,
the numerical value is a sum of squares of the sine and cosine wave signals,
the rotational angle is obtained by calculating an arctangent of the sine and cosine wave signals,
the processor is configured to read the two correlated signals,
the numerical value and the rotational angle are calculated by the processor based on the two correlated signals, and
when the processor determines that a failure has occurred in the rotational angle sensor, the processor operates the actuator in fail-safe operation.

6. A control apparatus for an actuator that rotates a rotating body, the control apparatus comprising a processor, the processor being configured to control the actuator so that a rotational angle of the rotating body obtained from an output value of a rotational angle sensor that outputs two correlated signals which change in response to a rotational angle of the rotating body, converges to a target angle, wherein the processor is configured to determine that a failure has not occurred in the rotational angle sensor when a numerical value obtained from the two correlated signals is within a predetermined range and the rotational angle obtained from the two correlated signals is within a range of from 30° to 60°, 120° to 150°, 210° to 240°, or from 300° to 330°, the two correlated signals are a sine wave signal and a cosine wave signal, respectively, the numerical value is a sum of squares of the sine and cosine wave signals, the rotational angle is obtained by calculating an arctangent of the sine and cosine wave signals, the processor is configured to read the two correlated signals, and the numerical value and the rotational angle are calculated by the processor based on the two correlated signals, and when the processor determines that a failure has occurred in the rotational angle sensor, the processor operates the actuator in fail-safe operation.

7. The control apparatus, according to claim 6, wherein when the processor determines that a failure has occurred in the rotational angle sensor, the processor is configured to shift the rotational angle obtained from the output value of the rotational angle sensor into the predetermined range at a freely chosen timing.

8. The control apparatus, according to claim 6, wherein the two correlated signals are a sine wave signal and a cosine wave signal.

9. The control apparatus, according to claim 8, wherein the numerical value is a sum of squares of the sine and cosine wave signals.

* * * * *